United States Patent
Willey

[11] 3,888,509
[45] June 10, 1975

[54] BIFURCATED SHOULDER AND LAP CONTINUOUS SAFETY HARNESS

[75] Inventor: Ronald Albert Willey, Port Huron, Mich.

[73] Assignee: The Firestone Tire & Rubber Company, Akron, Ohio

[22] Filed: Nov. 1, 1972

[21] Appl. No.: 302,791

[52] U.S. Cl. ................................ 280/150 SB
[51] Int. Cl. .................................. B60r 21/10
[58] Field of Search .............. 280/150 SB; 297/389

[56] References Cited
UNITED STATES PATENTS

| | | | |
|---|---|---|---|
| 2,886,259 | 5/1959 | Barecki | 280/150 SB |
| 3,348,881 | 10/1967 | Weman | 280/150 SB |
| 3,420,573 | 1/1969 | Holmberg | 297/389 |

Primary Examiner—Robert R. Song
Attorney, Agent, or Firm—Miller, Morriss, Pappas & McLeod

[57] ABSTRACT

A safety harness for automobile drivers and passengers in which a continuous single piece of webbing or belting provides a lap belt support and a shoulder harness extending bifurcation-like loops over the shoulders of the user. The belt or webbing is secured to an inertial type or a locker type retractor so that the belting is adjustably extendable and retractable automatically adjusting to various sizes of users. From the retractor the belt extends upwardly over one shoulder and toward the head of the driver and over a slide bar in the roof of the vehicle behind the head of the user, driver or passenger. Then the belting extends downwardly over the other shoulder of the driver or passenger and to a transition ring and tongue slidable on the lower run and intermediate a fixed connection on the floor of the vehicle adjacent the inboard side of the user, driver or passenger. The ring and tongue element can be stowed on the dash at a convenient hook point or at the ceiling adjacent the sun visor above the windshield when not in use. After the passenger or driver has seated himself with his inboard arm under the inboard loop of belting he can then plug the tongue piece into a buckle receptacle adjacent the outboard side of his seat and mid-way of his body and this brings the outboard shoulder loop into position over the outboard arm of the driver or passenger and the lap belt is suitably positioned across the lap of the wearer. The only action required was the plug-in of the ring-tongue and its stored location is dangling before the user but does not obstruct entry. A switch or relay in the receptacle integrates the system into a seat belt monitoring override or warning provided in the wiring harness or ignition of the vehicle.

5 Claims, 8 Drawing Figures

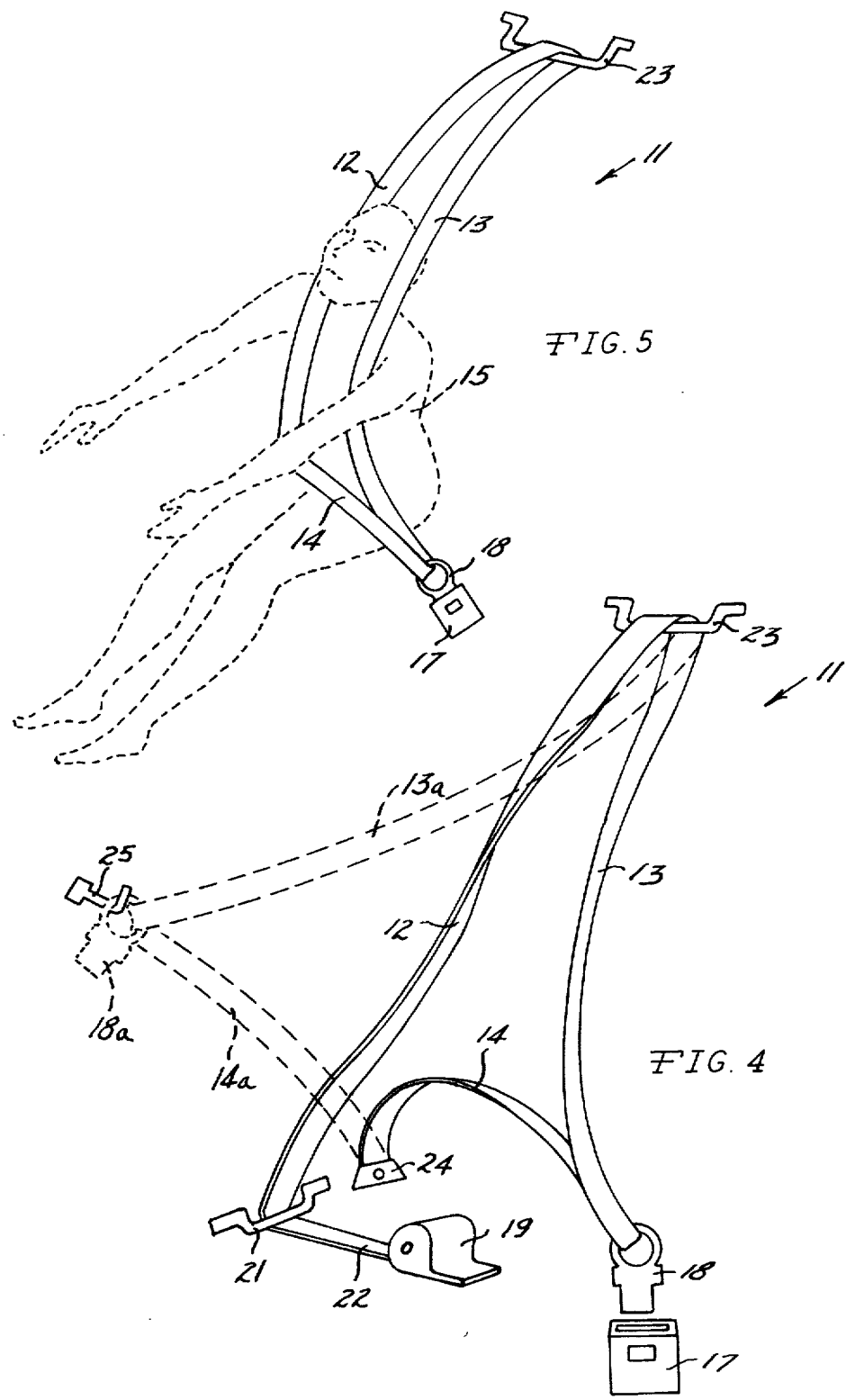

BIFURCATED SHOULDER AND LAP CONTINUOUS SAFETY HARNESS

The present invention is a new, useful and comfortable safety harness particularly adapted for bucket-seat or sport cars but also adaptable to outboard driver and passenger positions, front and back, in bench type seating. In safety belt usage it has been long appreciated that the more support webbing that can be used to support the body of a passenger or driver, the safer that user, passenger or driver would be. However, public resistance to wearing of safety belting has resulted in minimal belting usage. Because of this resistance, passive restraint systems are under careful scrutiny by automotive safety people but the reliability of such systems is in some doubt. Users have expressed that if a good harness were devised, this would be their preference assuming ease of usage, minimum inconvenience and reasonable comfort and freedom. The present harness structure accomplishes these objectives. Those experiencing use of the harness structure here devised have actually expressed that the sensation of security with reasonable body freedom is itself an encouragement to use and that the unused positioning of the belting invites unconscious usage of the device. In addition, the total stressing of the lap belt and shoulder belt loops in the single piece of webbing results in even distribution of shock stresses along its entire length. When used with an inertial type retractor maximum body freedom is enjoyed and the total hardware requirements are vastly simplified avoiding complex buckle structures for lap and shoulder three point type connection. Reduction of hardware can mean substantial reduction in cost.

Accordingly, the principal object of the present invention is to provide a harness structure that will be used.

Another object is to provide a continuous belt shoulder and lap support device.

Another object is to provide comfort and support for harness users.

Still other objects including simplicity, economy, adaptability to warning and ignition control and adaptability to to known hardware and economy of installation will be obvious as the description proceeds.

PRIOR ART

A wide variety of prior art harness devices confirm the need for the simplicity and facility of the present invention. The closest known structures are seen in U.S. Letters Pat. Nos. 3,371,942 to V. A. Buck and E. G. Nagle; 3,491,966 to R. J. Curran and S. V. Zanoni; 3,258,293 to J. E. Sharp; 3,567,247 to W. J. Sobkow and E. P. Grenier; 3,583,726 to O. L. Lindblad; 3,583,764 to T. E. Lohr; 3,618,975 to F. B. Bomback; and 3,414,322 to H. G. Linderoth. While some of these structures show the use of continuous belting and some show bifurcated shoulder harness, none appear to express an integration of these two concepts in one piece of webbing to provide simple effective support.

IN THE DRAWINGS

FIG. 4 is an enlarged perspective view of the harness of the present invention isolated in spaces to indicate the plug-in connection at an outboard receptacle and the optional storage of the ring-tongue element on dash or visor.

FIG. 5 illustrates a shock condition and illustrates the unusually good support provided by the harness under an emergency stop or crash.

GENERAL DESCRIPTION

A single piece of belting is provided in a vehicle and is applicable to individual drivers or passengers and hence is best adapted to bucket-seat situations. Bench seats will also find these harnesses useful but the passenger intermediate the outboard passengers will require another type of harness. The continuous single strand of webbing is retractable and extendable from a retractor reel preferably of the inertial type but the reel may also be of the locker type. The preference for inertial retractors is so that the passenger and driver are permitted maximum body freedom against a uniformly applied tension except in emergency situations. The reel or retractor is located beneath the seat and belting is guidably extendable through the seat or between cushions and seat back over the seat and upward toward a slider anchor bar located in the roof of the car behind the head of the user. Then the same webbing passes over the bar and downwardly over the seat and is secured to the floor of the vehicle by an anchor adjacent the inboard side of the user adjacent the first floor connection. Between the slider anchor bar and the floor anchor, a ring-tongue element is slidably located on the webbing. The ring-tongue and connected webbing can be suspended conveniently by a bracket or hook on the dash, ceiling or at the visor area when not supporting a passenger or user. This disposition of the harness greets the user on entry to the vehicle. Then, as he seats himself, his inboard arm (right on driver in U. S., left on passenger in U. S. front) passes naturally under the first upward shoulder loop portion of the belting. Then, with the left or right hand, the ring-tongue is grasped, moved outboard across the body of the user and is plugged into a buckle receptacle adjacent the outboard edge of the vehicle seat. This movement adjusts the shoulder loops or bifurcations and lap belt portion, simultaneously, under a tension established by the retractor and consistent through the entire length of webbing. If the retractor is inertial, the normal movements of the driver or passenger are free against mild retractor spring tension until an emergency condition is sensed as by deceleration of the vehicle or acceleration of the belting. If a safety interlock is provided in the ignition or control, the relay in the tongue receptacle monitors the insertion and locking of the harness system so that either the vehicle cannot be started or a warning compels attachment of the belt. Retractor tension assures proper adjustment to the body of the user. Automatic locking retractors are also useable but restrict the movement of the wearer after connection of the harness.

SPECIFIC DESCRIPTION

Figure 1:
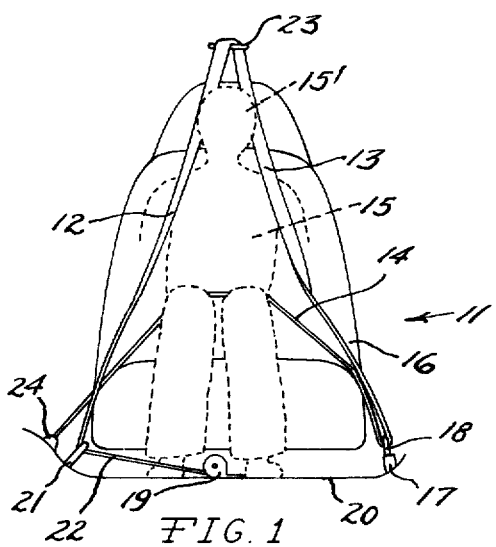
FIG. 1 is front elevation view of the continuous lap and shoulder harness combination as provided in a vehicle and assembled around a driver or passenger.
Figure 2:
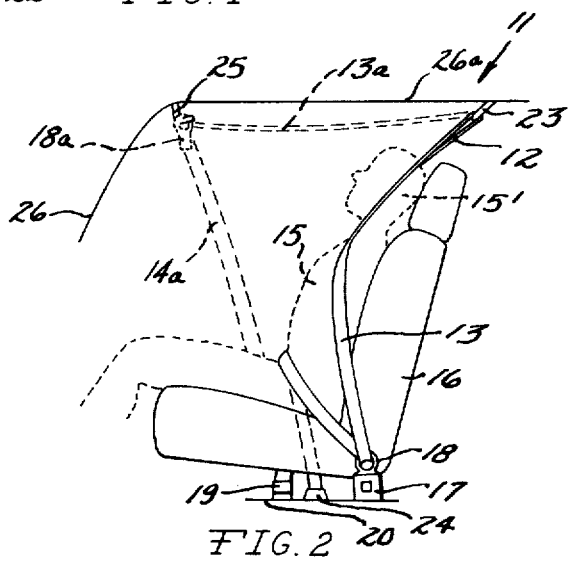
FIG. 2 is a side elevation view of the structure and passenger or driver shown in FIG. 1 and indicating in phantom line the non-use disposition of the belting.
Figure 3:
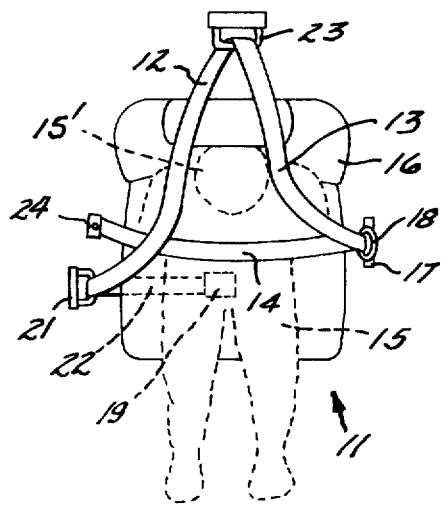
FIG. 3 is a top plan view of the structure seen in FIGS. 1 and 2 and indicating the positioning of the belting to provide both lap belt and shoulder harness loops in a continuous run.

Referring to the drawings and with particularity to the FIG. 1 thereof, a continuous safety harness 11 is shown forming looped shoulder support by portions 12 and 13 and a lap support portion 14 shown applied to the wearer 15 (phantom line) seated in a vehicle seat 16 of the bucket type. The continuous safety harness 11 is a webbing of fabric or resin fiber and mixtures thereof in woven or mesh material as commonly used in automobiles and aircraft safety belt arrangements. A buckle receptacle 17, adjacent the wearer, is a plug-in receptacle for the ring-tongue 18. The ring-tongue 18 performs the dual purpose of a lock tongue and a transition ring changing the direction of webbing trained thereon. A seat belt retractor 19 is conveniently located beneath the seat 16 where it is secured to the vehicle floor or frame 20 and applies retracting or winding retractor spring tension to the entire harness 11. A guide element 21, also secured to the floor 20 of the vehicle, trains the belt webbing 22 upward toward the slide bar 23 located in the roof 26a of the vehicle 26 above and rearwardly of the head 15' of the wearer 15. This forms the first loop 12 of the shoulder supports 12 and 13 and the second loop 13 is formed by the webbing coursing downward from the overhead anchor or slide bar 23 to selected connection in the receptacle 17 by means of the ring-tongue 18. The ring-tongue 18 slides between lap portion 14 and shoulder loop support 13 and draws the lap belt portion 14 into position across the lap of the wearer 15 and thence to the anchor 24 securing the end of the harness 11 to the floor 20 of the vehicle. In the FIG. 2, the harness 11 of FIG. 1 is best represented in profile and the phantom lines show the storage position of belt portions 13 and 14 as 13a and 14a, respectively, with the ring-tongue 18 disconnected from the buckle receptacle 17 and placed on the hook 25 as indicated at 18a. The hook 25 is shown located at visor level but can be placed elsewhere, for example, on the dash panel or door post, as desired, so that deposit on exit and handling on entry is convenient for the user and its position, obstructing vision, insists that the wearer deploy the ring-tongue 18 into the receptacle 17 to get the harness out of the way. The disposition, as shown in FIG. 2, of the portions 13a and 14a, results from the retracting action of the retractor 19 on the continuous harness 11. FIG. 3 illustrates the construction just described in reference to FIGS. 1 and 2 but in plan view.

By reference to FIG. 4, the continuous harness 11 is enlarged to indicate its simplicity and hardware features and also indicates the stowed position in the phantom line portions 13a, 14a and 18a corresponding to the belting portions 13, 14 and sliding ring-tongue 18 is shown disconnected but preparatory to connection in the receptacle 17.

The FIG. 5, slightly stylized, illustrates the stress application of the harness 11 to the wearer 15, the shoulder support loops 12 and 13 are supporting the shoulders and the lap belt portion 14 is in support of the lower torso of the wearer and in avoidance of "submarining". This also shows the single fastening of ring-tongue 18 to achieve lock-up of the harness 11. This continuous loop harness 11 equalizes stresses through all portions of the webbing thus distributing local stresses to the total tightening throughout the system. Thrust on the loops 12 and 13 by the shoulders tightens the lap portion 14.

Figure 6:
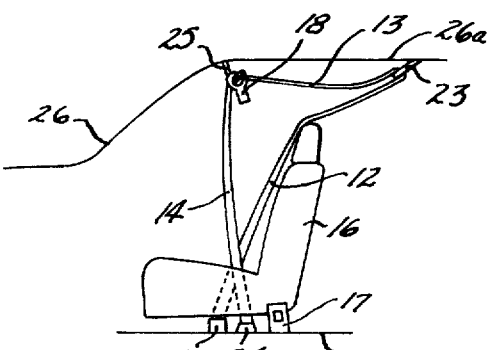
FIG. 6 is a side elevation view of the harness of the present invention with the ring-tongue supported at the visor and representing the condition of the belting on entry of passenger or driver.

FIG. 6 indicates the disposition of the harness 11 on entry to the vehicle 26. The driver or passenger can slide into the vehicle 26 across the seat 16 and in the instance of the driver (as shown), the right arm is passed under the loop portion 12 of the belt forming the inboard run of the shoulder harness portion of the harness 11. Then, with right or left hand, the driver or passenger removes the ring-tongue 18 from the hook 25 and accomplishes insertion of the ring-tongue 18 into the buckle receptacle 17 thereby locking up the harness 11 with only one free motion which adjusts the shoulder support loops 12 and 13 and adjusts the lap belt portion 14 over the lap against the retractor tension which is uniformly applied by the retractor 24.

Figure 7:
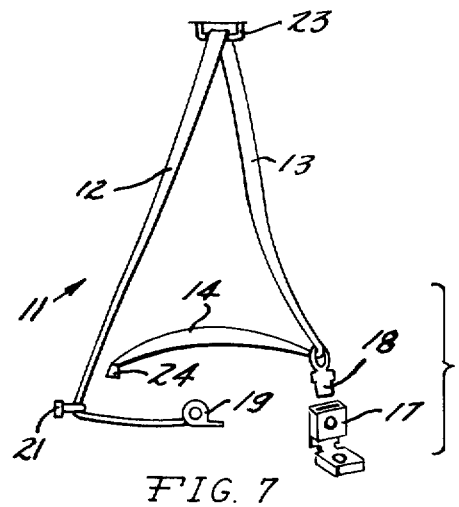
FIG. 7 is a front elevation view of the harness of the present invention as extended preparatory to plug-in of the ring-tongue.

FIG. 7 shows the motion toward the receptacle located adjacent the driver or passenger and adjacent the seat secured to the floor 20 as previously described. This allows the harness 11 to easily adjust itself to various sizes of drivers or passengers and to movement of the seat 16 without impairment of performance. The act of connecting the webbing by the slider tongue element 18 to the receptacle 17 positions and tensions the shoulder support loop 13 and the lap support 14.

Figure 8:
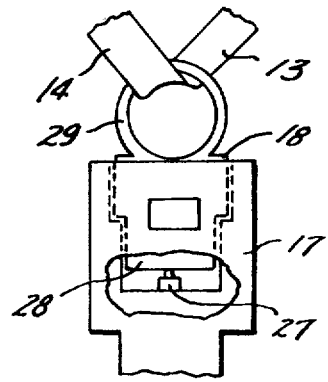
FIG. 8 is an illustration in side elevation view showing in partial cross section the impingement of tongue on a switch or relay signalling the hooked up condition of the harness and for integration with ignition or control and warning circuitry.

In FIG. 8 the buckle receptacle 17 is cut away to indicate the presence of a switch 27 actuated to selected closed or open position upon insertion of the tongue portion 28 of the ring-tongue element 18 and accordingly providing a monitor or signal connection to the ignition circuit or warning circuits of the automobile. The ring portion 29 of the ring-tongue 18 is shown in support of the webbing runs 13 and 14 and permitting equalizing distribution of stress.

In operation, the single webbing continuous safety harness as herein described has provided itself in convenience and represents a marked improvement in performance over lap belt and lap belt single shoulder and three point systems. The deployment gently compels use and the safety "feel" consequent to use results in the building of a safety habit for users of seat belts. The convenience of a single connection in a sophisticated harness is a structural achievement moving toward customer acceptance and use.

Having thus described the invention in substantial detail, in the form of an operative embodiment, those skilled in the art will readily appreciate improvements, changes and modifications and such improvements, changes and modifications are intended to be included herein where falling within the spirit and scope of the hereinafter appended claims.

I claim:

1. A safety harness for occupants of vehicles comprising:
    a floor anchor;
    a single length of webbing secured at one end to a retractor and partially extendable and retractable therefrom and thereinto and at the other end said webbing secured to said floor anchor;

an anchor bar above and behind the head of a wearer;

a portion of said webbing intermediate the ends thereof trained to extend upwardly to a slip position on said anchor bar and thence downwardly to form shoulder support loops;

a lap portion extending from said loops and in continuation of said webbing and secured terminally to said floor anchor;

a ring-tongue having tongue portion and a ring portion freely slidable on said webbing intermediate said shoulder support loops and said lap belt portions; and a receptacle secured to the floor of a vehicle into which the tongue portion of said ring-tongue is lockably and selectively releasable.

2. A safety harness in accord with claim 1 wherein a hanger element is provided remote from said receptacle and above the elevation of said floor anchor and below the elevation of said anchor bar and on which said ring-tongue is secured when said ring-tongue is not secured in said receptacle.

3. A one piece webbing combination of lap belt and shoulder safety harness for roofed vehicles comprising:

a seat belt retractor;

seat belt webbing at one end retractably and lockably secured to said retractor;

a course of webbing from said retractor running upward and over one shoulder of a wearer;

a slide bar secured above and rearwardly of the head of a wearer to the roof of said vehicle and said webbing extends over said bar;

an extension of said webbing running down from said slide bar and over the other shoulder of said wearer;

a sliding tongue element having a tongue portion and ring portion, said ring portion slidably on said webbing;

a lap belt portion of said webbing extending over the lap of a wearer from said sliding tongue;

a receptacle into which said tongue portion of said sliding tongue is selectively and lockably and removably inserted; and a floor anchor secured to the other end of said webbing below and adjacent the lap of said wearer.

4. A continuous safety harness structure providing shoulder and lap restraint for users in automotive vehicles and the like comprising:

a single length of webbing providing, in continuous variable length, a pair of shoulder support loop portions and a lap belt portion;

means lockably and partially extending and retracting said webbing at one end;

a slip anchor bar above and behind the head of a user over which said webbing is trained to form said pair of shoulder support loops;

a slip ring and lock tongue element having a slip ring portion and a lock tongue portion slidably on said webbing intermediate one of said shoulder support loop portions and said lap belt portion of said webbing;

a lock receptacle secured to the floor of said vehicle and adjacent said user into which said lock tongue portion of said slip ring and lock tongue element is releasably inserted; and a floor anchor secured to the terminal end of said webbing after said lap belt portion.

5. A safety harness for users of vehicles such as automobiles comprising:

a seat in a vehicle;

a pair of floor anchors adjacent to each other and adjacent said seat, one of said anchors including lockable extension and retraction means;

a slip bar anchor above and behind the head of a user seated in said seat;

a lock receptacle secured adjacent said seat on the side of said seat opposite said floor anchors;

a continuous single piece of webbing secured at its ends to said floor anchors and one course rising from one of said anchors over one shoulder of a user in said seat, over said slip bar, down over the other shoulder of a user in said seat and thence to one of said anchors; and a slip ring and tongue piece having a slip ring portion and a tongue portion slidable on said webbing between said last mentioned end of said webbing and said slip bar anchor whereby upon insertion in said receptacle, a lap belt portion is formed and uniform tension is applied throughout the length of said webbing.

* * * * *